United States Patent
Chang et al.

(10) Patent No.: US 8,211,955 B2
(45) Date of Patent: Jul. 3, 2012

(54) ACTINICALLY-CROSSLINKABLE SILICONE-CONTAINING BLOCK COPOLYMERS

(75) Inventors: Frank Chang, Suwanee, GA (US); Guigui Wang, Westfield, IN (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 13/240,592

(22) Filed: Sep. 22, 2011

(65) Prior Publication Data
US 2012/0010321 A1   Jan. 12, 2012

Related U.S. Application Data

(62) Division of application No. 12/313,546, filed on Nov. 20, 2008, now Pat. No. 8,044,111.

(60) Provisional application No. 60/991,324, filed on Nov. 30, 2007.

(51) Int. Cl.
*C08J 3/28* (2006.01)
(52) U.S. Cl. ..................................... 522/127
(58) Field of Classification Search ............. 522/127
See application file for complete search history.

(56) References Cited

U.S. PATENT DOCUMENTS

| | | | |
|---|---|---|---|
| 3,356,758 A | 12/1967 | Omietanski | |
| 3,384,599 A | 5/1968 | Omietanski | |
| 3,445,419 A | 5/1969 | Vanderlinde | |
| 3,661,744 A | 5/1972 | Kehr | |
| 3,867,420 A | 2/1975 | Morehouse | |
| 4,008,341 A | 2/1977 | Kehr | |
| 4,031,271 A | 6/1977 | Bush | |
| 4,119,617 A | 10/1978 | Hanyuda | |
| 4,120,721 A | 10/1978 | Ketley | |
| 4,229,273 A | 10/1980 | Wajs | |
| 4,284,539 A | 8/1981 | Homan | |
| 4,289,867 A | 9/1981 | Martin | |
| 4,312,575 A | 1/1982 | Peyman | |
| 4,632,844 A | 12/1986 | Yanagihara | |
| 4,952,711 A | 8/1990 | Jacobine | |
| 5,100,929 A | 3/1992 | Jochum | |
| 5,219,965 A | 6/1993 | Valint, Jr. | |
| 5,227,432 A | 7/1993 | Jung | |
| 5,336,797 A * | 8/1994 | McGee et al. ............... 556/419 |
| 5,358,976 A | 10/1994 | Dowling | |
| 5,371,181 A | 12/1994 | Glaser | |
| 5,387,663 A | 2/1995 | McGee | |
| 5,407,970 A * | 4/1995 | Peterson et al. .............. 522/33 |
| 5,407,971 A * | 4/1995 | Everaerts et al. ............. 522/35 |
| 5,449,729 A | 9/1995 | Lai | |
| 5,505,884 A | 4/1996 | Burke | |
| 5,508,317 A | 4/1996 | Müller | |
| 5,512,205 A | 4/1996 | Lai | |
| 5,527,925 A | 6/1996 | Chabrecek | |
| 5,563,184 A | 10/1996 | McGee | |
| 5,583,463 A | 12/1996 | Merritt | |
| 5,612,389 A | 3/1997 | Chabrecek | |
| 5,612,391 A | 3/1997 | Chabrecek | |
| 5,620,684 A * | 4/1997 | Dupuis ....................... 424/70.12 |
| 5,621,018 A | 4/1997 | Chabrecek | |
| 5,665,840 A | 9/1997 | Pöhlmann | |
| 5,708,094 A | 1/1998 | Lai | |
| 5,760,100 A | 6/1998 | Nicolson | |
| 5,789,464 A | 8/1998 | Müller | |
| 5,849,810 A | 12/1998 | Müller | |
| 5,849,811 A | 12/1998 | Nicolson | |
| 5,981,669 A | 11/1999 | Valint, Jr. | |
| 5,981,675 A | 11/1999 | Valint, Jr. | |
| 5,998,498 A | 12/1999 | Vanderlaan | |
| 6,367,929 B1 | 4/2002 | Maiden | |
| 6,451,871 B1 | 9/2002 | Winterton | |
| 6,627,124 B1 | 9/2003 | Herbrechtsmeier | |
| 6,669,873 B1 | 12/2003 | Smith | |
| 6,719,929 B2 | 4/2004 | Winterton | |
| 6,762,264 B2 | 7/2004 | Künzler | |
| 6,765,083 B2 | 7/2004 | Ford | |
| 6,793,973 B2 | 9/2004 | Winterton | |
| 6,800,225 B1 | 10/2004 | Hagmann | |
| 6,811,805 B2 | 11/2004 | Gilliard | |
| 6,822,016 B2 | 11/2004 | McCabe | |
| 6,896,926 B2 | 5/2005 | Qiu | |
| 6,943,203 B2 | 9/2005 | Vanderlaan | |
| 7,052,131 B2 | 5/2006 | McCabe | |
| 7,091,283 B2 | 8/2006 | Müller | |
| 7,238,750 B2 | 7/2007 | Müller | |
| 7,249,848 B2 | 7/2007 | Laredo | |
| 7,268,189 B2 | 9/2007 | Müller | |
| 7,384,590 B2 | 6/2008 | Kelly | |
| 7,387,759 B2 | 6/2008 | Kelly | |
| 8,003,710 B2 | 8/2011 | Medina | |
| 2005/0209402 A1 | 9/2005 | Ziegler | |
| 2005/0237483 A1 | 10/2005 | Phelan | |
| 2006/0128826 A1* | 6/2006 | Ellison et al. ............... 522/127 |
| 2007/0010634 A1 | 1/2007 | Ziegler | |

FOREIGN PATENT DOCUMENTS

| | | | |
|---|---|---|---|
| EP | 0216074 A2 | 4/1987 |
| EP | 0229033 A2 | 7/1987 |
| EP | 0331633 A2 | 9/1989 |
| EP | 1477511 A1 | 11/2004 |
| WO | 9209421 A2 | 6/1992 |

(Continued)

Primary Examiner — James J Seidleck
Assistant Examiner — Peter A Salamon
(74) Attorney, Agent, or Firm — Jian Zhou

(57) ABSTRACT

The invention provide a new class of silicone-containing prepolymers containing poly(oxyalkylene) blocks, polysiloxane blocks, and actinically-crosslinkable groups which are acryl groups, thiol groups, ene-containing groups or combinations thereof. A preopolymer of the invention is prepared in a one-pot procedure according to the Michael addition of thiol to electron deficient alkenes, such as α,β-unsaturated carbonyl compounds, without need for additional reaction step(s) to introduce actinically crosslinkable groups. The present invention is also related to silicone hydrogel contact lenses made from this class of silicone-containing prepolymers and to methods for making the silicone hydrogel contact lenses.

11 Claims, No Drawings

FOREIGN PATENT DOCUMENTS

| | | | |
|---|---|---|---|
| WO | 9218548 | A1 | 10/1992 |
| WO | 9309084 | A1 | 5/1993 |
| WO | 9323773 | A1 | 11/1993 |
| WO | 9825982 | A1 | 6/1998 |
| WO | 0059970 | A1 | 10/2002 |
| WO | 2006055409 | A2 | 5/2006 |

* cited by examiner

ACTINICALLY-CROSSLINKABLE SILICONE-CONTAINING BLOCK COPOLYMERS

This application is a divisional application of application Ser. No. 12/313,546, filed Nov. 20, 2008 now U.S. Pat. No. 8,044,111, which claims the benefit under 35 U.S.C. §119 (e) of U.S. provisional application Ser. No. 60/991,324 filed Nov. 30, 2007, the contents of which are incorporated herein by reference in its entirety.

The present invention is related to a class of silicone-containing prepolymers and uses thereof. In particular, the present invention is related to silicone hydrogel contact lenses made from this class of silicone-containing prepolymers.

BACKGROUND

In recent years, soft silicone hydrogel contact lenses become more and more popular because of their high oxygen permeability and comfort. "Soft" contact lenses can conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health.

However, all commercially available silicone hydrogel contact lenses are produced according to a conventional cast molding technique involving use of disposable plastic molds and a mixture of monomers and/or macromers. There are several disadvantages with such conventional cast-molding technique. For example, a traditional cast-molding manufacturing process must include lens extraction in which unpolymerized monomers must be removed from the lenses by using an organic solvent. Such lens extraction increases the production cost and decreases the production efficiency. In addition, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

The above described disadvantages encountered in a conventional cast-molding technique can be overcome by using the so-called Lightstream Technology™ (CIBA Vision), which involves (1) a lens-forming composition being substantially free of monomers and comprising a substantially purified prepolymer with ethylenically-unsaturated groups, (2) reusable molds produced in high precision, and (3) curing under a spatial limitation of actinic radiation (e.g., UV), as described in U.S. Pat. Nos. 5,508,317, 5,583,463, 5,789,464, and 5,849,810. Lenses can be produced at relatively lower cost according to the Lightstream Technology™ to have high consistency and high fidelity to the original lens design.

In order to fully utilize the Lightstream Technology™ to make silicone hydrogel contact lenses, there is still a need for new actinically-crosslinkable prepolymers suitable for making silicone hydrogel contact lenses with desired mechanical strength and desired physical properties according to the Lightstream Technology™.

SUMMARY OF THE INVENTION

In one aspect, the present invention provides an actinically crosslinkable prepolymer which is a block copolymer which comprises: poly(oxyalkylene) blocks; polysiloxane blocks; and actinically-crosslinkable groups, wherein the block copolymer is obtained by copolymerizing a mixture comprising (1) at least one poly(oxyalkylene) having at least two first reactive groups, (2) at least one polysiloxane having at least two second reactive groups, and (3) optionally a hetero difunctional compound having one ene-containing group and one first or second reactive group, wherein the first and second reactive groups, different from each other, are either thiol groups or acryl group and undergo Michael addition reaction to form carbon-sulfur bonds.

In another aspect, the invention provides a soft contact lens. The soft contact lens of the invention comprises: a silicone hydrogel material that is obtained by curing a lens-forming material in a mold, wherein the lens-forming material comprises at least one actinically crosslinkable prepolymer and is substantially free of vinylic monomers and crosslinking agent with molecular weight of less than 1500 Daltons, wherein the prepolymer comprises poly(oxyalkylene) blocks, polysiloxane blocks and actinically-crosslinkable groups, wherein the prepolymer is obtained by copolymerizing a mixture comprising (1) at least one poly(oxyalkylene) having at least two first reactive groups, (2) at least one polysiloxane having at least two second reactive groups, and (3) optionally a hetero difunctional compound having one ene-containing group and one first or second reactive group, wherein the first and second reactive groups, different from each other, are either thiol groups or acryl group and undergo Michael addition reaction to form carbon-sulfur bonds, wherein the formed soft contact lens has a modulus of from about 0.2 MPa to about 2.0 MPa and a water content of from about 15% to about 80% by weight when the formed soft contact lens is fully hydrated.

In a further aspect, the invention provides a method for producing soft contact lenses. The method comprises the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens-forming material into the cavity, wherein the lens-forming material comprises at least one actinically crosslinkable prepolymer and is substantially free of vinylic monomers and crosslinking agent with molecular weight of less than 1500 Daltons, wherein the prepolymer comprises poly(oxyalkylene) blocks; polysiloxane blocks; and actinically-crosslinkable groups, wherein the prepolymer is obtained by copolymerizing a mixture comprising (1) at least one poly(oxyalkylene) having at least two first reactive groups, (2) at least one polysiloxane having at least two second reactive groups, and (3) optionally a hetero difunctional compound having one ene-containing group and one first or second reactive group, wherein the first and second reactive groups, different from each other, are either thiol groups or acryl group and undergo Michael addition reaction to form carbon-sulfur bonds; and actinically irradiating the lens-forming material in the mold to crosslink said one or more crosslinkable prepolymers to form the contact lens, wherein the formed soft contact lens has a modulus of from about 0.2 MPa to about 2.0 MPa and a water content of from about 15% to about 80% by weight when the formed soft contact lens is fully hydrated.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that can be polymerized. Low molecular weight typically means average molecular weights less than 700 Daltons.

An "actinically-crosslinkable group" refers to a group which can react with another group of same type or different type to form a covalent linkage upon actinic irradiation. Examples of actinically-crosslinkable groups include without limitation acryl groups, thiol groups, ene-containing groups. Acryl groups can undergo free-radical chain reaction upon actinic irradiation. Thiol groups (—SH) and ene-containing groups can participate in thiol-ene step-growth radical polymerization as described in a commonly-owned copending U.S. patent application No. 60/869,812 filed Dec. 13, 2006 (entitled "PRODUCTION OF OPHTHALMIC DEVICES BASED ON PHOTO-INDUCED STEP GROWTH POLYMERIZATION", herein incorporated in reference in its entirety.

An "acryl group" is an organic radical having a formula of

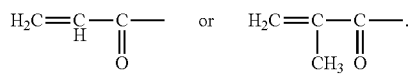

A "ene-containing group" is a mono-valent or divalent radical contains a carbon-carbon double which is not directly linked to a carbonyl group (—CO—), nitrogen atom, or oxygen atom and is defined by any one of formula (I)-(III)

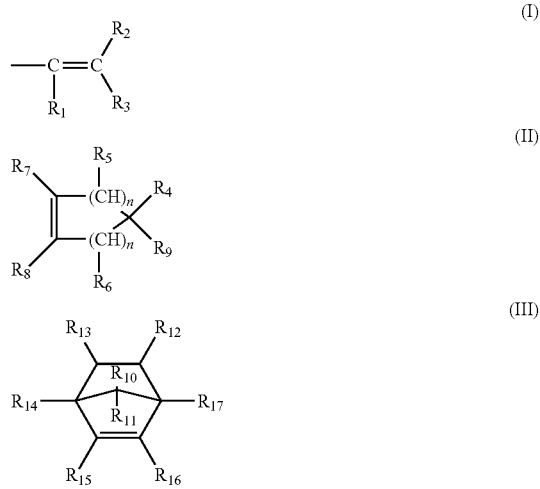

in which $R_1$ is hydrogen, or $C_1$-$C_{10}$ alkyl; $R_2$ and $R_3$ independent of each other are hydrogen, $C_1$-$C_{10}$ alkene divalent radical, $C_1$-$C_{10}$ alkyl, or —$(R_{18})_a$—$(X_1)_b$—$R_{19}$ in which $R_{18}$ is $C_1$-$C_{10}$ alkene divalent radical, $X_1$ is an ether linkage (—O—), a urethane linkage (—N), a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_1$-$C_{18}$ alkylaminoalkoxy group, $C_1$-$C_{18}$ carboxyalkoxy group, or $C_1$-$C_{18}$ hydroxyalkoxy group, a and b independent of each other is zero or 1, provided that only one of $R_2$ and $R_3$ is a divalent radical; $R_4$-$R_9$, independent of each other, are hydrogen, $C_1$-$C_{10}$ alkene divalent radical, $C_1$-$C_{10}$ alkyl, or —$(R_{18})_a$—$(X_1)_b$—$R_{19}$, provided that only one or two of $R_4$-$R_9$ are divalent radicals; n and m independent of each other are integer number from 0 to 9, provided that the sum of n and m is an integer number from 2 to 9; $R_{10}$-$R_{17}$, independent of each other, are hydrogen, $C_1$-$C_{10}$ alkene divalent radical, $C_1$-$C_{10}$ alkyl, or —$(R_{18})_a$—$(X_1)_b$—$R_{19}$, provided that only one or two of $R_{10}$-$R_{17}$ are divalent radicals.

A "vinylic monomer", as used herein, refers to a monomer that has an ethylenically unsaturated group and can be polymerized actinically or thermally.

The term "olefinically unsaturated group" or "ethylenically unsaturated group" is employed herein in a broad sense and is intended to encompass any groups containing a >C═C< group. Exemplary ethylenically unsaturated groups include without limitation acryloyl, methacryloyl, allyl, vinyl, styrenyl, or other C═C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

The term "fluid" as used herein indicates that a material is capable of flowing like a liquid.

A "hydrophilic monomer" refers to a monomer which can be polymerized to form a polymer that is water-soluble or can absorb at least 10 percent by weight of water.

A "hydrophobic monomer", as used herein, refers to a vinylic monomer which is polymerized to form a polymer that is insoluble in water and can absorb less than 10 percent by weight water.

A "macromer" refers to a medium and high molecular weight compound which can be polymerized and/or crosslinked. Medium and high molecular weight typically means average molecular weights greater than 700 Daltons.

An "actinically-polymerizable macromer" refers to a macromer which can be polymerized actinically. In accordance with the invention, an actinically-polymerizable macromer can be a macromer with one or more ethylenically unsaturated groups, with two or more thiol groups, or one or more ene-containing groups, which can participate in either free radical chain growth polymerization or thiol-ene step-growth radical polymerization.

A "prepolymer" refers to a starting polymer which contains actinically crosslinkable groups and can be cured (e.g., crosslinked) actinically to obtain a crosslinked polymer having a molecular weight much higher than the starting polymer.

A "silicone-containing prepolymer" refers to a prepolymer which contains silicone and can be crosslinked actinically to obtain a crosslinked polymer having a molecular weight much higher than the starting polymer.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "multiple" refers to three or more.

As used herein, a "pre-formed and crosslinkable hydrophilic polymer" refers to a hydrophilic polymer that contains one or more crosslinkable groups and is prepared or obtained prior to being added in a reaction mixture for making a prepolymer of the invention.

The term "dangling polymer chains" in reference to a prepolymer of the invention is intended to describe that the prepolymer comprises polymer chains which each are anchored to the main chain of the prepolymer through one single covalent linkage (preferably at one of the ends of a dangling linear polymer chain).

A "poly(oxyalkylene) block" refers to a divalent of formula IV

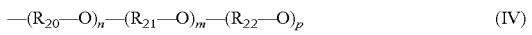
$$-(R_{20}-O)_n-(R_{21}-O)_m-(R_{22}-O)_p \quad (IV)$$

wherein $R_{20}$, $R_{21}$, and $R_{22}$, independently of one other, are each linear or branched $C_2$-$C_4$-alkylene or hydroxy-substituted $C_2$-$C_8$ alkylene radical, and n, m and p, independently of one another, are each a number from 0 to 100, wherein the sum of (n+m+p) is 5 to 1000. The sum of (n+m+p) is preferably from 8 to 200, more preferably from 8 to 100.

A "polysiloxane block" refers to a divalent radical of formula (V)

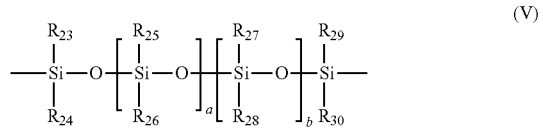
$$(V)$$

in which $R_{23}$, $R_{24}$, $R_{25}$, $R_{26}$, $R_{27}$, $R_{28}$, $R_{29}$ and $R_{30}$, independently of one another, are $C_1$-$C_8$-alkyl, $C_1$-$C_4$ alkyl- or $C_1$-$C_4$— alkoxy-substituted phenyl, fluorinated $C_1$-$C_{18}$-fluoroalkyl, $C_1$-$C_{18}$ fluoroether, $C_1$-$C_6$-hydroxyalkyl, $C_1$-$C_6$-aminoalkyl, alk-NH-alk-$NH_2$, -alk-$(OCH_2CH_2)_{n1}$—$(OCH_2)_{n2}$—$OR_{31}$, wherein alk is $C_1$-$C_8$-alkylene, $R_{31}$ is hydrogen or $C_1$-$C_6$ alkyl, n1 and n2 independently of one another are an integer from 0 to 10, a and b independently of one other are an integer of from 2 to 700 and (a+b) is from 5 to 700.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. For example, a spatial limitation of UV radiation can be achieved by using a mask or screen that has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region. The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Patent Application No. 60/811,949 (herein incorporated by reference in its entirety), and LbL coating. A preferred class of surface treatment processes are plasma processes, in which an ionized gas is applied to the surface of an article. Plasma gases and processing conditions are described more fully in U.S. Pat. Nos. 4,312,575 and 4,632,844, which are incorporated herein by reference. The plasma gas is preferably a mixture of lower alkanes and nitrogen, oxygen or an inert gas.

"LbL coating", as used herein, refers to a coating that is not covalently attached to a contact lens or a mold half and is obtained through a layer-by-layer ("LbL") deposition of polyionic (or charged) and/or non-charged materials on the lens or mold half. An LbL coating can be composed of one or more layers.

As used herein, a "polyionic material" refers to a polymeric material that has a plurality of charged groups or ionizable groups, such as polyelectrolytes, p- and n-type doped conducting polymers. Polyionic materials include both polycationic (having positive charges) and polyanionic (having negative charges) materials.

Formation of an LbL coating on a contact lens or mold half may be accomplished in a number of ways, for example, as described in U.S. Pat. Nos. 6,451,871, 6,719,929, 6,793,973, 6,811,805, 6,896,926 (herein incorporated by references in their entirety).

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (advancing angle measured by Wilhelmy Plate method), which is obtained by averaging measurements of at least 3 individual contact lenses.

Water contact angle on a contact lens is a general measure of the surface hydrophilicity (or wettability) of the contact lens. In particular, a low water contact angle corresponds to more hydrophilic surface. Average contact angles (advancing) of contact lenses are measured using Wilhelmy Plate method.

An "antimicrobial agent", as used herein, refers to a chemical that is capable of decreasing or eliminating or inhibiting the growth of microorganisms such as that term is known in the art.

"Antimicrobial metals" are metals whose ions have an antimicrobial effect and which are biocompatible. Preferred antimicrobial metals include Ag, Au, Pt, Pd, Ir, Sn, Cu, Sb, Bi and Zn, with Ag being most preferred.

"Antimicrobial metal-containing nanoparticles" refer to particles having a size of less than 1 micrometer and containing at least one antimicrobial metal present in one or more of its oxidation states.

"Antimicrobial metal nanoparticles" refer to particles which is made essentially of an antimicrobial metal and have a size of less than 1 micrometer. The antimicrobial metal in the antimicrobial metal nanoparticles can be present in one or more of its oxidation states. For example, silver-containing nanoparticles can contain silver in one or more of its oxidation states, such as $Ag^0$, $Ag^{1+}$, and $Ag^{2+}$.

"Stabilized antimicrobial metal nanoparticles" refer to antimicrobial metal nanoparticles which are stabilized by a stabilizer during their preparation. Stabilized antimicrobial metal nano-particles can be either positively charged or negatively charged or neutral, largely depending on a material (or so-called stabilizer) which is present in a solution for preparing the nano-particles and can stabilize the resultant nano-particles. A stabilizer can be any known suitable material. Exemplary stabilizers include, without limitation, positively charged polyionic materials, negatively charged polyionic materials, polymers, surfactants, salicylic acid, alcohols and the like.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3\ oxygen)/(cm^2)(sec)(mm^2\ Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3\ oxygen)(mm)/(cm^2)(sec)(mm^2\ Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm $$\left(\frac{90 \times 10^{-10}}{0.09} = 100 \times 10^{-9}\right)$$

(oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness according to a coulemetric method described in Examples.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where n'=rate of ion transport [mol/min]
A=area of lens exposed [mm²]
D=Ionoflux Diffusion Coefficient [mm²/min]
dc=concentration difference [mol/L]
dx=thickness of lens [mm]

The Ionoton Ion Permeability Coefficient, P, is then determined in accordance with the following equation:

$$\ln(1 - 2C(t)/C(0)) = -2APt/Vd$$

where:
C(t)=concentration of sodium ions at time t in the receiving cell
C(0)=initial concentration of sodium ions in donor cell
A=membrane area, i.e., lens area exposed to cells V=volume of cell compartment (3.0 ml)
d=average lens thickness in the area exposed
P=permeability coefficient An Ionoflux Diffusion Coefficient, D, of greater than about $1.5 \times 10^{-6}$ mm$^2$/min is preferred, while greater than about $2.6 \times 10^{-6}$ mm$^2$/min is more preferred and greater than about $6.4 \times 10^{-6}$ mm$^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

In general, the invention is directed to a class of actinically crosslinkable silicone-containing prepolymers and uses thereof. A preopolymer of the invention can be prepared in a one-pot procedure according to the Michael addition of thiol to electron deficient alkenes (In particular α,β-unsaturated carbonyl compounds). Resultant prepolymers will have actinically crosslinkable groups such as acryl groups, thiol groups, ene-containing groups, or combination thereof, without need for additional reaction step(s) to introduce actinically crosslinkable groups. Alternatively, the resultant prepolymers can be further modified to have ene-containing groups covalently attached thereto according any very well known coupling reactions.

There are several potential unique features associated with use of prepolymers of the invention in making silicone hydrogel contact lens. First, a prepolymer of the invention can be cured actinically on a timescale of seconds. Second, a lens-forming formulation (polymerizable composition) can be a solution of the prepolymer which has been substantially purified (i.e., removing substantially starting materials for making the prepolymer). No lens extraction is necessary after curing of the lens. Third, prepolymers of the invention can fully utilize the advantages provided by the Lightstream Technology™ (CIBA Vision) in make silicone hydrogel contact lenses at a relatively lower cost and at high consistency and high fidelity to the original lens design.

In one aspect, the present invention provides an actinically crosslinkable prepolymer which is an actinically-crosslinkable block copolymer which comprises: poly(oxyalkylene) blocks; polysiloxane blocks; and actinically-crosslinkable groups, wherein the block copolymer is obtained by copolymerizing a mixture comprising (1) at least one poly(oxyalkylene) having at least two first reactive groups, (2) at least one polysiloxane having at least two second reactive groups, and (3) optionally an organic compound having one ene-containing group and one first or second reactive group, wherein the first and second reactive groups, different from each other, are either thiol groups or acryl group and undergo Michael addition reaction to form carbon-sulfur bonds.

In accordance with the invention, the prepolymer is capable of being actinically crosslinked, in the absence of one or more monomers, to form a silicone hydrogel contact lens.

A prepolymer of the invention comprises actinically crosslinkable groups, preferably at least three actinically crosslinkable groups selected from the group consisting of acryl groups, thiol groups, ene-containing groups, and combination thereof.

Where crosslinking of a prepolymer of the invention is based on the mechanism of free radical chain-growth polymerization, the prepolymer comprises preferably at least three ethylenically unsaturated groups.

Where crosslinking of a prepolymer of the invention is based on the mechanism of thiol-ene step-growth radical polymerization, the actinically crosslinkable groups of the prepolymer preferably comprises at least three thiol groups or at least three ene-containing groups.

Where the prepolymer comprises multiple ene-containing groups, these groups undergo thiol-ene step-growth radical polymerization in the presence of thiol groups which can be provided by a step-growth-crosslinking agent having two or more thiol groups. Similarly, where the prepolymer comprises multiple thiol groups, these groups undergo thiol-ene step-growth radical polymerization in the presence of ene-containing groups which can be provided by a step-growth-crosslinking agent having two or more ene-containing groups.

In a preferred embodiment, a prepolymer of the invention comprises: from about 15% to about 70% by weight, preferably from about 25% to about 60%, of polysiloxane blocks; from about 30% to about 85%, preferably from about 40% to 75% by weight, of poly(oxyalkylene) blocks.

In a preferred embodiment, a prepolymer of the invention is obtained from the copolymerization of at least one poly(oxyalkylene) with at least two first reactive groups and at least one polysiloxane with at least two second reactive groups; wherein the first and second reactive groups are different from each other and can undergo Michael addition reaction, wherein the first and second reactive groups are thiol or acryl groups. Where the ratio of molar equivalent of acryl groups to thiol groups is greater than 1, the resultant prepolymer comprises terminal acryl groups. Where the ratio of molar equivalent of acryl groups to thiol groups is less than 1, the resultant prepolymer comprises terminal thiol groups.

In another preferred embodiment, a prepolymer of the invention is obtained from the copolymerization of at least one poly(oxyalkylene) with at least two first reactive groups, at least one polysiloxane with at least two second reactive groups, and a hetero difunctional compound having one ene-containing group and one first or second reactive group; wherein the first and second reactive groups are different from each other and can undergo Michael addition reaction, wherein the first and second reactive groups are thiol or acryl groups. Where the ratio of molar equivalent of acryl groups to thiol groups is greater than 1, the resultant prepolymer comprises terminal acryl groups and ene-containing groups. Where the ratio of molar equivalent of acryl groups to thiol groups is less than 1, the resultant prepolymer comprises terminal thiol groups and ene-containing groups.

Suitable poly(oxyalkylene) can be a linear or branched polymer so long as they include terminal thiol or acryl groups. Where poly(oxyalkylene) is a linear polymer, it has two terminal acryl or thiol groups. Where poly(oxyalkylene) is a branched polymer, it is end-capped with acryl or thiol groups (i.e., multiple terminal acryl or thiol groups). Such poly(oxyalkylene) can be obtained either directly from commercial suppliers or by converting a poly(oxyalkylene) with terminal functional groups, e.g., selected from the group consisting of amino groups, hydroxyl groups, acid chloride groups, isocyanate group, and epoxy groups, into an acryl- or thiol-capped poly(oxyalkylene) according to any known covalently coupling reactions.

Various acryl- or thiol-capped poly(ethylene glycol) (PEG), such as, e.g., acrylate-PEG-acrylate, methacrylate-PEG-methacrylate, acrylamide-PEG-acrylamide, thiol-PEG-thiol, 4 arm star-like PEG-acrylate, 4 arm star-like PEG-thiol (sulfhydryl), can be obtained directly from commercial suppliers, e.g., Polyscience, and Shearwater Polymers, inc., or CreativeBiochem Laboratories (Winston Salem, N.C.).

Various di-functional group-terminated poly(ethylene glycol) (PEG), di-functional group-terminated block copolymers of ethylene oxide and propylene oxide ((PEG/PPG block copolymers, e.g., poloxamers or poloxamine), can be obtained from commercial suppliers, such as, Polyscience, and Shearwater Polymers, inc., etc.

Preferably, the functional groups of the poly(oxyalkylene) is selected from the group consisting of hydroxyl groups (—OH), primary amino groups (—NH$_2$), secondary amino groups (—NHR), carboxyl groups (—COOH), epoxy groups, aldehyde groups (—CHO), amide groups (—CONH$_2$), acid halide groups (—COX, X=Cl, Br, or I), isothiocyanate groups, isocyanate groups, halide groups (—X, X=Cl, Br, or I), acid anhydride groups, and combinations thereof.

It is well known in the art that a pair of matching reactive groups can form a covalent bond or linkage under known coupling reaction conditions, such as, oxidation-reduction conditions, dehydration condensation conditions, addition conditions, substitution (or displacement) conditions, Diels-Alder reaction conditions, cationic crosslinking conditions, and epoxy hardening conditions. For example, an amino group reacts with aldehyde group to form a Schiff base which may further be reduced; an amino group reacts with an acid chloride to form an amide linkage (—CO—N—); an amino group reacts with an isocyanate to form a urea linkage; an hydroxyl reacts with an isocyanate to form a urethane linkage; an hydroxyl reacts with an epoxy to form an ether linkage (—O—); a hydroxyl reacts with an acid chloride to form an ester linkage.

It is understood that coupling agents may be used. For example, a carbodiimide can be used in the coupling of a carboxyl and an amine to form an amide linkage between the molecules being coupled. Examples of carbodiimides are 1-ethyl-3-(3-dimethylaminopropyl)carbodiimide (EDC), N,N'-dicyclohexylcarbodiimide (DCC), 1-cyclohexyl-3-(2-morpholinoethyl)carbodiimide, diisopropyl carbodiimide, or mixtures thereof. N-hydroxysuccinimide (NHS) or N-hydroxysulfosuccinimide may be desirably included in carbodiimide (e.g., EDC)-mediated coupling reaction to improve coupling (conjugation) efficiency. EDC couples NHS to carboxyls, resulting in an NHS-activated site on a molecule. The formed NHS-ester can react with amines to form amides.

For example, acryl groups can be covalently attached to the functional groups (e.g., amine, hydroxyl, carboxyl, isocyanate, epoxy groups) of poly(oxyalkylene). Any acryl-containing monomer having a hydroxy, amino, carboxyl, epoxy, acid-chloride, isocyanate group, which is coreactive with isocyanate, amine, hydroxyl, carboxy, or epoxy groups of a poly(oxyalkylene) in the absence or presence of a coupling agent (such as, e.g., EDC, diisocyanate, or diacid chloride), can be used in ethylenically functionalizing the precursor polymer or copolymer. Examples of such acryl-containing monomers include, without limitation, for reacting with terminal hydroxy groups, 2-isocyanatoethyl methacrylate, methacrylic anhydride, 3-isopropenyl-alpha, alpha-dimethylbenzyl isocyanate, acryloyl chloride, or methacryloyl chloride, glycidyl methacrylate; for reacting with terminal amine groups, 2-isocyanatoethyl methacrylate, 3-isopropenyl-alpha, alpha-dimethyl benzyl isocyanate, methacrylic anhydride, acrylic acid, methacrylic acid, acryloyl chloride, or methacryloyl chloride; for reacting with terminal carboxy groups in the presence of EDC, vinylamine, 2-aminoethyl methacrylate or 3-aminopropyl methacrylamide. The above list is not exhaustive but illustrative. A person skilled in the art will know how to select an acryl-containing monomer with a functional group to functionalize ethylenically hydrophilic precursor polymers or copolymers.

Suitable polydisiloxane can be a linear or branched polymer so long as they include terminal thiol or acryl groups. Where polydisiloxane is a linear polymer, it has two terminal acryl or thiol groups. Where polydisiloxane is a branched polymer, it is end-capped with acryl or thiol groups (i.e., multiple terminal acryl or thiol groups). Such polydisiloxane can be obtained either directly from commercial suppliers (e.g., from Gelest, Inc, or Fluorochem) or by converting a polydisiloxane with terminal functional groups, e.g., selected from the group consisting of amino groups, hydroxyl groups, acid chloride groups, isocyanate group, and epoxy groups, into a acryl- or thiol-capped polydisiloxane according to any known covalently coupling reactions as described above.

Examples of linear polysiloxanes with two terminal functional groups selected from the consisting of amino groups, hydroxyl groups, acid chloride groups, and epoxy groups include without limitation di-functional group-terminated polysiloxane, such as, for example, poly(dialkylsiloxane), poly(diarylsiloxane), polyarylalkylsiloxane, copolymers of different dialkysiloxanes, copolymers of dialkylsiloxane with diarylsiloxane or arylalkylsiloxane, or the likes. Various di-functional group terminated polysiloxanes can be obtained from commercial suppliers (e.g., from Gelest, Inc, or Fluorochem). Otherwise, one skilled in the art will know how to prepare such di-functional group-terminated polysiloxanes according to procedures known in the art and described in Journal of Polymer Science—Chemistry, 33, 1773 (1995) (herein incorporated by reference in its entirety).

Hetero difunctional compounds can be prepared according to any known covalently coupling methods described above. For example, 2-norbornene-5-carboxylic acid can be used to prepared a hetero difunctional compound having an ene-containing (norbornene) group and an acryl group by reacting it with an aminoalkylacrylate or aminoalkylmethacrylate in the presence of EDC. Similarly, 2-norbornene-5-carboxylic acid can be used to prepared a hetero difunctional compound having an ene-containing (norbornene) group and a thiol group by reacting it with an aminomercaptane (e.g., aminoethanethiol) in the presence of EDC.

In another preferred embodiment, the prepolymer is obtained by copolymerization of a mixture comprising (a) at least one linear poly(oxyalkylene) with two first reactive groups, (b) at least one linear polysiloxane with two second reactive groups, (c) a branched poly(oxyalkylene) with multiple first reactive groups, a branched polysiloxane with multiple second reactive groups, or combination thereof, and (d) optionally a hetero difunctional compound having one ene-containing group and one first or second reactive group, wherein the first and second reactive groups, different from each other, are either thiol groups or acryl groups.

Preferably, the branched poly(oxyalkylene) or polysiloxane is a star polymer having 3 to 5 arms.

As used herein, a star polymer refers to a macromolecule having a small core of molecules (branch point) with branches (i.e., chain segments) radiating from the core.

In another preferred embodiment, the prepolymer is obtained by copolymerization of a mixture comprising (a) at least one linear poly(oxyalkylene) with two first reactive groups, (b) at least one linear polysiloxane with two second reactive groups, (c) a branched poly(oxyalkylene) with multiple first reactive groups, a branched polysiloxane with multiple second reactive groups, or combination thereof, (d) at least one poly(oxyalkylene) with one single first reactive group, and (e) optionally a hetero difunctional compound having one ene-containing group and one first or second reactive group, wherein the first and second reactive groups, different from each other, are either thiol groups or acryl groups. It is believed that by incorporating mono-thiol or mono-acryl terminated poly(oxyalkylene), the resultant prepolymer comprises dangling hydrophilic polymer chains (poly(oxyalkylene)) and that such prepolymer can be used to prepare silicon hydrogel contact lenses with a high oxygen permeability and a hydrophilic surface without post-curing surface treatment. It is also believed that when a solution of such prepolymer is introduced in a mold for making contact lenses, the dangling hydrophilic polymer chains of the prepolymer is preferably adsorbed at the interface between the mold and the prepolymer solution to form an interfacial films, which is composed essentially of dangling hydrophilic polymer chains and has adequate thickness, prior to curing (polymerization) and subsequently preserved after curing. As such, one can make a silicone hydrogel contact lens with a hydrophilic interfacial film thereon without any post curing surface treatment. The mixture can further comprise monothiol- or monoacryl-terminated polysiloxane.

Mono-thiol or mono-acryl-terminated poly(oxyalkylene) can be obtained either directly from commercial suppliers or by converting a poly(oxyalkylene) with mono terminal functional group, e.g., selected from the group consisting of amino groups, hydroxyl groups, acid chloride groups, isocyanate group, and epoxy groups, into a acryl- or thiol-capped poly(oxyalkylene) according to any known covalently coupling reactions as described above. For example, methoxy-PEG-thiol (Sulfhydryl) and methoxy-PEG-acrylate can be obtained from Polyscience, and Shearwater Polymers, inc., or CreativeBiochem Laboratories (Winston Salem, N.C.). Various monofunctional terminated PEGs can be obtained from Shearwater Polymers, Inc. or CreativeBiochem Laboratories (Winston Salem, N.C.). Preferred monofunctional-terminated PEGs are those PEGs with one amino, hydroxyl, acid chloride, or epoxy group at one terminus and a methoxy or ethoxy group at the other terminus, such as, for example, methoxy-PEG-amine, methoxy-PEG-isocyanate, methoxy-PEG-epoxide, methoxy-PEG-hydroxy, et.

Preferably, the molecular weights of mono-thiol- or mono-acryl-terminated poly(oxyalkylene)s are at least about two folds, more preferably at least about 5 folds, even more preferably at least about 10 folds, of the molecular weights of di- or multiple-thio or acryl terminated poly(oxyalkylene)s.

In accordance with the invention, the dangling hydrophilic polymer chains of the prepolymer each are free of thio or acryl groups. The dangling hydrophilic polymer chains are present in the prepolymer in an amount sufficient to impart a silicone hydrogel material, obtained by curing the prepolymer, a hydrophilic surface without post-curing surface treatment. A prepolymer of the invention comprises about 2% to about 15%, preferably from about 4% to about 10% by weight, of dangling hydrophilic poly(oxyalkylene) chains.

In a further preferred embodiment, the prepolymer is obtained by copolymerization of a mixture comprising (a) at least one linear poly(oxyalkylene) with two first reactive groups, (b) at least one linear polysiloxane with two second reactive groups, (c) a branched poly(oxyalkylene) with multiple first reactive groups or a branched polysiloxane with multiple second reactive groups, (d) at least one polysiloxane with one single second reactive group, and (e) optionally a hetero difunctional compound having one ene-containing group and one first or second reactive group, wherein the first and second reactive groups, different from each other, are either thiol groups or acryl groups. It is believed that by incorporating mono-thiol or mono-acryl terminated polysiloxane, the resultant prepolymer comprises dangling polysiloxane chains the amount of which can be varied to adjust the mechanic properties (e.g., modulus, elongation, etc.) of the silicone hydrogel contact lens prepared from the prepolymer. Such prepolymer can be used to prepare silicon hydrogel contact lenses with a high oxygen permeability and desirable mechanic properties. The mixture preferably further comprises monothiol- or monoacryl-terminated poly(oxyalkylene).

Suitable mono-thiol or mono-acryl-terminated polysiloxane can be obtained either directly from commercial suppliers or by converting a polysiloxane with mono terminal functional group, e.g., selected from the group consisting of amino groups, hydroxyl groups, acid chloride groups, isocyanate group, and epoxy groups, into a acryl- or thiol-capped polysiloxane according to any known covalently coupling reactions as described above. For example, methoxy-PEG-thiol (Sulfhydryl) and methoxy-PEG-acrylate can be obtained from Polyscience, and Shearwater Polymers, inc., or CreativeBiochem Laboratories (Winston Salem, N.C.). Various monofunctional terminated PEGs can be obtained from Shearwater Polymers, Inc. or CreativeBiochem Laboratories (Winston Salem, N.C.). Preferred monofunctional-terminated PEGs are those PEGs with one amino, hydroxyl, acid chloride, or epoxy group at one terminus and a methoxy or ethoxy group at the other terminus, such as, for example, methoxy-PEG-amine, methoxy-PEG-isocyanate, methoxy-PEG-epoxide, methoxy-PEG-hydroxy, et.

A preferred class of monoacryl-terminated polysiloxanes have the formula (VI)

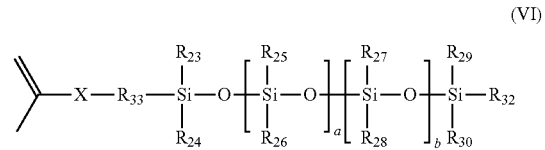

in which $R_{23}$, $R_{24}$, $R_{25}$, $R_{26}$, $R_{27}$, $R_{28}$, $R_{29}$ and $R_{30}$, independently of one another, are $C_1$-$C_8$-alkyl, $C_1$-$C_4$ alkyl- or $C_1$-$C_4$-alkoxy-substituted phenyl, fluorinated $C_1$-$C_{18}$-fluoroalkyl, $C_1$-$C_{18}$ fluoroether, $C_1$-$C_6$-hydroxyalkyl, $C_1$-$C_6$-aminoalkyl, alk-NH-alk-NH$_2$, -alk-(OCH$_2$CH$_2$)$_{n1}$—(OCH$_2$)$_{n2}$—OR$_{31}$, wherein alk is $C_1$-$C_8$-alkylene, $R_{31}$ is hydrogen or $C_1$-$C_6$ alkyl, n1 and n2 independently of one another are an integer from 0 to 10, a and b independently of one other are an integer of from 2 to 700 and (a+b) is from 5 to 700; X denotes —COO—, —CONR$_{34}$—, —OCOO—, or —OCONR$_{34}$—, where each $R_{34}$ is independently H or $C_1$-$C_7$ alkyl; $R_{33}$ denotes a divalent $C_1$-$C_{25}$ alkyl or $C_6$-$C_{30}$ aryl radical, which may interrupted by —O—, —COO—, —CONR$_{14}$—, —OCOO— or —OCONR$_{14}$— and may comprise hydroxy group, primary, secondary, or tertiary amine group, carboxy group, or carboxylic acid; $R_{32}$ is a monovalent $C_1$-$C_{25}$ alkyl or $C_6$-$C_{30}$ aryl radical, which may interrupted by —O—, —COO—, —CONR$_{14}$—, —OCOO— or —OCONR$_{14}$— and may comprise hydroxy group, primary, secondary, or tertiary amine group, carboxy group, or carboxylic acid. Preferred examples of such monoacryl-terminated polysiloxanes are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy) propyl terminated, mono-butyl terminated polydimethylsiloxane). Alternatively, monoethylenically functionalized polysiloxanes can be obtained by ethylenically functionalizing of a monofunctionalized polysiloxanes (i.e., with one sole terminal functional group, such as, e.g., —NH$_2$, —OH, —COOH, epoxy group, etc.) as described above. Suitable monofunctionalized polysiloxanes are commercially available, e.g., from Aldrich, ABCR GmbH & Co., Fluorochem, or Gelest, Inc, Morrisville, Pa.

In another preferred embodiment, a prepolymer of the invention comprises polysiloxane blocks of formula (V)

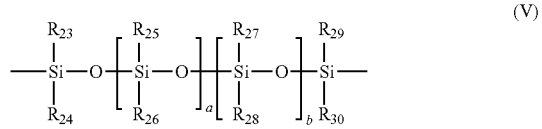

in which $R_{23}$, $R_{24}$, $R_{25}$, $R_{26}$, $R_{27}$, $R_{28}$, $R_{29}$ and $R_{30}$, independently of one another, are $C_1$-$C_8$-alkyl, $C_1$-$C_4$ alkyl- or $C_1$-$C_4$-alkoxy-substituted phenyl, fluorinated $C_1$-$C_{18}$-fluoroalkyl, $C_1$-$C_{18}$ fluoroether, $C_1$-$C_6$-hydroxyalkyl, $C_1$-$C_6$-aminoalkyl, alk-NH-alk-$NH_2$, -alk-$(OCH_2CH_2)_{n1}$—$(OCH_2)_{n2}$—$OR_{31}$, wherein alk is $C_1$-$C_8$-alkylene, $R_{31}$ is hydrogen or $C_1$-$C_6$ alkyl, n1 and n2 independently of one another are an integer from 0 to 10, a and b independently of one other are an integer of from 2 to 700 and (a+b) is from 5 to 700, provided that at least one of $R_{23}$, $R_{24}$, $R_{25}$, $R_{26}$, $R_{27}$, $R_{28}$, $R_{29}$ and $R_{30}$ is fluorinated $C_1$-$C_{18}$-fluoroalkyl, $C_1$-$C_{18}$ fluoroether, $C_1$-$C_6$-hydroxyalkyl, $C_1$-$C_6$-aminoalkyl, alk-NH-alk-$NH_2$, -alk-$(OCH_2CH_2)_{n1}$—$(OCH_2)_{n2}$—$OR_{31}$.

In another preferred embodiment, a prepolymer of the invention is obtained by copolymerization of a mixture comprising (a) at least one linear poly(oxyalkylene) with two first reactive groups, (b) at least one linear polysiloxane with two second reactive groups, (c) a branched agent having at least three first reactive groups or at least three second reactive groups, and (d) optionally a hetero difunctional compound having one ene-containing group and one first or second reactive group, wherein the first reactive groups and the second reactive groups, different from each other, are either thiol groups or acryl groups. Preferably, the mixture includes a poly(oxyalkylene) with one single first reactive group, a polysiloxane with one single second reactive group, or combination thereof.

In accordance with the invention, a branching agent is any organic compound comprising from three to seven thiol or acryl groups, preferably from three to five thiol or acryl groups. Examples of such branching agents include without limitation glycerol trimethylacrylate, trimethylolpropane trimethylacrylate, trimethylolpropane triacrylate, trimethylolpropane trimethacrylate, pentaerythritol triacrylate, pentaerythritol tetraacrylate, pentaerythritol trimethacrylate, pentaerythritol tetramethacrylate, tris(2-hydroxyethyl)isocyanurate trimethacrylate, tris(2-hydroxyethyl)isocyanurate triacrylate, di pentaerythritol pentaacrylate, ethoxylated pentaerythritol tetraacrylate, trimethylolethane triacrylate, di pentaerythritol hexaacrylate, sorbitol triacrylate, sorbitol tetraacrylate, sorbitol pentaacrylate, sorbitol hexaacrylate, tri(acryloyloxyethyl)isocyanurate, dipentaerythritol hexamethacrylate, sorbitol trimethacrylate, sorbitol tetramethacrylate, trithiocyanuric acid, isocyanurate trithiol (e.g., 1,3,5-tris-[2-hydroxyethyl-(3-mercaptopropionate)] isocyanurate or 1,3,5-tris-[2-hydroxyethyl-(2-mercaptoacetate)], pentaerythritol tetrakis(thioglycolate), pentaerythritol tetrakis(2-mercaptopropionate), pentaerythritol tetrakis(3-mercaptopropionate), trimethylolpropane tris(2-mercaptopropionate), trimethylolpropane tris(3-mercaptopropionate), 1,2,3-propanetrithiol.

In preparation of a prepolymer of the invention, molar equivalent number of the acryl groups preferably are higher than the thiol groups in the mixture of starting materials for making the prepolymer. In this way, all of the thiol groups are consumed in Michael addition reaction and the resultant prepolymer would have terminal acryl groups.

The mixture for preparing a prepolymer of the invention can be a melt (solventless) or a solution in which all necessary component is dissolved in an inert solvent (i.e., should not interfere with the Michael addition reaction between thiol and acryl group), such as water, an organic solvent, or mixture thereof, as known to a person skilled in the art. Preferably, the mixture is a solventless liquid, because a solvent-free reaction can have simplicity in operation and environmentally friendliness and cost effectiveness without use of hazardous organic solvents.

The reaction temperature can be in the range of from about 30 to about 85° C. The reaction times may vary within wide limits. One can monitor the reaction by monitoring the consumption of one or more reactive groups participating in the reaction. It is understood that some reactions are preferably carried out in the presence of a catalyst, for example, strong bases, solid acids, Lewis acids, ionic liquid (e.g., n-Bu4NBr; 1-pentyl-3-methylimidazolium bromide ([pmlm]Br); 1-butyl-3-methylimidazolium bromide ([bmim][Br]); etc). A person skilled in the art will know how to select a catalyst in accelerating Michael addition reaction between thiol and acryl group.

Optionally, the mixture can also comprise one or more organic compounds having two thiol or acryl groups.

A prepolymer of the invention is capable of forming, preferably in the absence of any hydrophilic vinylic monomer, a silicone hydrogel or contact lens, which has a high oxygen permeability (characterized by an apparent oxygen permeability of at least 40 barrers, preferably at least about 60 barrers, even more preferably at least 80 barrers) and a hydrophilic surface (characterized by having an averaged water contact angle of less than about 90 degrees or less, preferably about 80 degrees or less, more preferably about 70 degrees or less, even more preferably about 60 degrees or less). The silicone hydrogel material or contact lens preferably has a high ion permeability (characterized by an Ionoflux Diffusion Coefficient, D, of greater than about $1.5 \times 10^{-6}$ $mm^2$/min, preferably greater than about $2.6 \times 10^{-6}$ $mm^2$/min, more preferably greater than about $6.4 \times 10^{-6}$ $mm^2$/min). The silicone hydrogel material or contact lens preferably has an elastic modulus of from about 0.2 MPa to about 2.0 MPa, preferably from about 0.3 MPa to about 1.5 MPa, more preferably from about 0.4 MPa to about 1.2 MPa. The silicone hydrogel material or contact lens preferably has a water content of preferably from about 15% to about 80%, more preferably from about 20% to about 65% by weight when fully hydrated. The water content of a silicone hydrogel contact lens can be measured according to Bulk Technique as disclosed in U.S. Pat. No. 5,849,811.

Preferably, the prepolymers used in the invention are previously purified in any known manner, for example, by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated solutions that are free, or at least substantially free, from reaction products, such as salts, and from starting materials. The preferred purification process for the prepolymers used in the process according to the invention, ultrafiltration, can be carried out in a manner known to a person skilled in the art. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner. Thus, after polymerization, the device will not require subsequent purification such as, for example, costly and complicated extraction of unpolymerized matrix-forming material. Furthermore, crosslinking of the prepolymer can take place absent a solvent or in aqueous solution so that a subsequent solvent exchange or the hydration step is not necessary.

In another aspect, the invention provides a soft contact lens. The soft contact lens of the invention comprises: a silicone hydrogel material that is obtained by curing a lens-forming material in a mold, wherein the lens-forming material comprises at least one actinically crosslinkable prepolymer and is substantially free of vinylic monomers and crosslinking agent with molecular weight of less than 1500 Daltons, wherein the prepolymer comprises poly(oxyalkylene) blocks, polysiloxane blocks and actinically-crosslinkable groups, wherein the prepolymer is obtained by copolymerizing a mixture comprising (1) at least one poly(oxyalkylene) having at least two first reactive groups, (2) at least one polysiloxane having at least two second reactive groups, and (3) optionally a hetero difunctional compound having one ene-containing group and one first or second reactive group, wherein the first and second reactive groups, different from each other, are either thiol groups or acryl group and undergo Michael addition reaction to form carbon-sulfur bonds, wherein the formed soft contact lens has a modulus of from about 0.2 MPa to about 2.0 MPa and a water content of from about 15% to about 80% by weight when the formed soft contact lens is fully hydrated.

In accordance with the invention, a lens-forming material is a fluid composition, which can be a solution or a melt at a temperature from about 20° C. to about 85° C. Preferably, a lens-forming material is a solution of at least one prepolymer of the invention and other desirable components in water, or an organic solvent, or a mixture of water and one or more organic solvents.

A solution of at least one prepolymer can be prepared by dissolving the prepolymer and other components in any suitable solvent known to a person skilled in the art.

All of the various embodiments of the prepolymer of the invention described above can be used in this aspect of the invention.

The lens-forming material can optionally but preferably does not comprise one or more monomer and/or one or more crosslinking agents (i.e., compounds with two or more actinically crosslinkable groups and with molecular weight less than 700 Daltons). However, the amount of those components should be low such that the final ophthalmic device does not contain unacceptable levels of unpolymerized monomers and/or crosslinking agents. The presence of unacceptable levels of unpolymerized monomers and/or crosslinking agents will require extraction to remove them, which requires additional steps that are costly and inefficient. But preferably, the lens-forming material is substantially free of vinylic monomer and crosslinking agent (i.e., preferably about 2% or less, more preferably about 1% or less, even more preferably about 0.5% or less by weight of combination of monomer and crosslinking agent).

It must be understood that a lens-forming material can also comprise various components, such as, for example, polymerization initiators (e.g., photoinitiator or thermal initiator), a visibility tinting agent (e.g., dyes, pigments, or mixtures thereof), UV-blocking (absorbing) agent, photosensitizers, inhibitors, antimicrobial agents (e.g., preferably silver nanoparticles or stabilized silver nanoparticles), bioactive agent, leachable lubricants, fillers, and the like, as known to a person skilled in the art.

Initiators, for example, selected from materials well known for such use in the polymerization art, may be included in the lens-forming material in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylphosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronitrile (AIBN).

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation non-crosslinkable hydrophilic polymers (i.e., without actinically crosslinkable groups).

Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof.

The number-average molecular weight $M_n$ of the non-crosslinkable hydrophilic polymer is preferably from 20,000 to 500,000, more preferably from 30,000 to 100,000, even more preferably from 35,000 to 70,000.

In accordance with the invention, the lens-forming material can be introduced (dispensed) into a cavity formed by a mold according to any known methods.

Lens molds for making contact lenses are well known to a person skilled in the art and, for example, are employed in cast molding or spin casting. For example, a mold (for full cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with a fluid polymerizable composition.

Methods of manufacturing mold sections for cast-molding a contact lens are generally well known to those of ordinary skill in the art. Virtually all materials known in the art for making molds can be used to make molds for making contact lenses. For example, polymeric materials, such as polyethylene, polypropylene, polystyrene, PMMA, a cyclic olefin copolymer, such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky., or the like can be used. Other materials that allow UV light transmission could be used, such as quartz glass and sapphire.

A person skilled in the art will know well how to cast mold lenses from a lens-forming formulation in molds based on thermal or actinic polymerization.

After the lens-forming material is dispensed into the mold, it is polymerized to produce a contact lens. Crosslinking may be initiated in the mold e.g. by means of actinic radiation, such as UV irradiation, ionizing radiation (e.g., gamma or X-ray irradiation). Where prepolymers of the invention are the polymerizable components in the lens-forming material, the mold containing the lens-forming material can be exposed to a spatial limitation of actinic radiation to crosslink the prepolymers.

In a preferred embodiment, reusable molds are used and the fluid composition is cured actinically under a spatial limitation of actinic radiation to form a contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

Opening of the mold so that the molded article can be removed from the mold may take place in a manner known to a person skilled in the art.

If the molded contact lens is produced solvent-free from an already purified prepolymer according to the invention, then after removal of the molded lens, it is not normally necessary to follow up with purification steps such as extraction. This is because the prepolymers employed do not contain any undesired constituents of low molecular weight; consequently, the crosslinked product is also free or substantially free from such constituents and subsequent extraction can be dispensed with. Accordingly, the contact lens can be directly transformed in the usual way, by hydration, into a ready-to-use contact lens. Appropriate embodiments of hydration are known to the person skilled in the art, whereby ready-to-use contact lenses with very varied water content may be obtained. The contact lens is expanded, for example, in water, in an aqueous salt solution, especially an aqueous salt solution having an osmolarity of about 200 to 450 milli-osmole in 1000 ml (unit: mOsm/ml), preferably about 250 to 350 mOsm/l and especially about 300 mOsm/l, or in a mixture of water or an aqueous salt solution with a physiologically compatible polar organic solvent, e.g. glycerol. Preference is given to expansions of the article in water or in aqueous salt solutions.

If the molded contact lens is produced from an aqueous solution of an already purified prepolymer according to the invention, then the crosslinked product also does not contain any troublesome impurities. It is therefore not necessary to carry out subsequent extraction. Since crosslinking is carried out in an essentially aqueous solution, it is additionally unnecessary to carry out subsequent hydration. The contact lenses obtained by this process are therefore notable, according to an advantageous embodiment, for the fact that they are suitable for their intended usage without extraction. By intended usage is understood, in this context, that the contact lenses can be used in the human eye.

Similarly, if the molded contact lens is produced from a solvent solution of an already purified prepolymer according to the invention, it is not necessary to carry out subsequent extraction, but instead of hydration process to replace the solvent.

The molded contact lenses can further subject to further processes, such as, for example, surface treatment, sterilization, and the like.

A contact lens of the invention has an oxygen permeability of preferably at least about 40 barrers, more preferably at least about 60 barrers, even more preferably at least about 80 barrers. In accordance with the invention, an oxygen permeability is an apparent (directly measured when testing a sample with a thickness of about 100 microns) oxygen permeability according to procedures described in Examples.

A contact lens of the invention has an elastic modulus of from about 0.2 MPa to about 2.0 MPa, preferably from about 0.3 MPa to about 1.5 MPa or less, more preferably from about 0.4 MPa to about 1.2 or less.

A contact lens of the invention further has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A contact lens of the invention further has a water content of preferably from about 15% to about 55%, more preferably from about 20% to about 38% by weight when fully hydrated. The water content of a silicone hydrogel contact lens can be measured according to Bulk Technique as disclosed in U.S. Pat. No. 5,849,811.

In a further aspect, the invention provides a method for producing soft contact lenses. The method comprises the steps of: comprising the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens-forming material into the cavity, wherein the lens-forming material comprises at least one actinically crosslinkable prepolymer and is substantially free of vinylic monomers and crosslinking agent with molecular weight of less than 1500 Daltons, wherein the prepolymer comprises poly(oxyalkylene) blocks; polysiloxane blocks; and actinically-crosslinkable groups, wherein the prepolymer is obtained by copolymerizing a mixture comprising (1) at least one poly(oxyalkylene) having at least two first reactive groups, (2) at least one polysiloxane having at least two second reactive groups, and (3) optionally a hetero difunctional compound having one ene-containing group and one first or second reactive group, wherein the first and second reactive groups, different from each other, are either thiol groups or acryl group and undergo Michael addition reaction to form carbon-sulfur bonds; and actinically irradiating the lens-forming material in the mold to crosslink said one or more crosslinkable prepolymers to form the contact lens, wherein the formed soft contact lens has a modulus of from about 0.2 MPa to about 2.0 MPa and a water content of from about 15% to about 80% by weight when the formed soft contact lens is fully hydrated.

All of the various embodiments of the prepolymer and contact lens of the invention described above can be used in this aspect of the invention.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

Example 1

Oxygen permeability measurements. The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 $cm^3$/min., while a nitrogen stream is passed on the opposite side of the lens at a rate of about 10 to 20 $cm^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where
$J$=oxygen flux [microliters $O_2/cm^2$-minute]
$P_{oxygen}$=($P_{measured}$-$P_{water}$ vapor)=(% $O_2$ in air stream) [mm Hg]=partial pressure of oxygen in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
where $Dk_{app}$ is expressed in units of barrers.

The oxygen transmissibility (Dk/t) of the material may be calculated by dividing the oxygen permeability ($Dk_{app}$) by the average thickness (t) of the lens.

Ion Permeability Measurements. The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ $mm^2$/minute.

What is claimed is:

1. A soft contact lens, comprising a silicone hydrogel material that is obtained by curing a lens-forming material in a mold, wherein the lens-forming material comprises at least one actinically crosslinkable prepolymer and is substantially free of vinylic monomers and crosslinking agent with molecular weight of less than 1500 Daltons, wherein the prepolymer comprises poly(oxyalkylene) blocks, polysiloxane blocks and actinically-crosslinkable groups, wherein the prepolymer is obtained by copolymerizing a mixture comprising
   (1) at least one linear poly(oxyalkylene) with two first reactive groups,
   (2) at least one linear polysiloxane with two second reactive groups,
   (3) a branched poly(oxyalkylene) with multiple first reactive groups, a branched polysiloxane with multiple second reactive groups, or combination thereof, and
   (4) optionally a hetero difunctional compound having one ene-containing group and one first or second reactive group,
   wherein the first and second reactive groups, different from each other, are either thiol groups or acryl groups and undergo Michael addition reaction to form carbon-sulfur bonds, wherein the formed soft contact lens has an elastic modulus of from about 0.2 MPa to about 2.0 MPa and a water content of from about 15% to about 80% by weight when the formed soft contact lens is fully hydrated.

2. The soft contact lens of claim 1, wherein the lens-forming material is substantially free of vinylic monomer and crosslinking agent.

3. The soft contact lens of claim 1, wherein the soft contact lens has an oxygen permeability of at least about 40 barrers, an Ionoflux Diffusion Coefficient, D, of $1.5 \times 10^{-6}$ mm$^2$/min, or combination thereof.

4. The soft contact lens of claim 1, wherein the prepolymer comprises three or more actinically crosslinkable groups selected from the group consisting of acryl groups, ene-containing groups, thiol groups, and combinations thereof, wherein the ene-containing groups is defined by any one of formula (I)-(III)

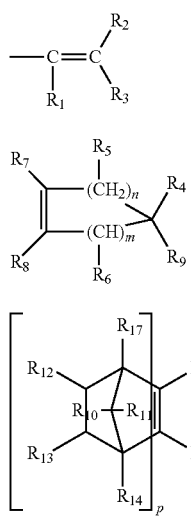

in which $R_1$ is hydrogen, or $C_1$-$C_{10}$ alkyl; $R_2$ and $R_3$ independent of each other are hydrogen, $C_1$-$C_{10}$ alkene divalent radical, $C_1$-$C_{10}$ alkyl, or —$(R_{18})_a$—$(X_1)_b$—$R_{19}$ in which $R_{18}$ is $C_1$-$C_{10}$ alkene divalent radical, $X_1$ is an ether linkage (—O—), a urethane linkage (—N), a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_1$-$C_{18}$ alkylaminoalkoxy group, $C_1$-$C_{18}$ carboxyalkoxy group, or $C_1$-$C_{18}$ hydroxyalkoxy group, a and b independent of each other is zero or 1, provided that only one of $R_2$ and $R_3$ is a divalent radical; $R_4$-$R_9$, independent of each other, are hydrogen, $C_1$-$C_{10}$ alkene divalent radical, $C_1$-$C_{10}$ alkyl, or —$(R_{18})_a$—$(X_1)_b$—$R_{19}$, optionally $R_4$ and $R_9$ are linked through an alkene divalent radical to form a cyclic ring, provided that at least one of $R_4$-$R_9$ are divalent radicals; n and m independent of each other are integer number from 0 to 9, provided that the sum of n and m is an integer number from 2 to 9; $R_{10}$-$R_{17}$, independent of each other, are hydrogen, $C_1$-$C_{10}$ alkene divalent radical, $C_1$-$C_{10}$ alkyl, or —$(R_{18})_a$—$(X_1)_b$—$R_{19}$, p is an integer number from 1 to 3, provided that only one or two of $R_{10}$-$R_{17}$ are divalent radicals.

5. The soft contact lens of claim 1, wherein the prepolymer comprises from about 15% to about 70% by weight of polysiloxane blocks and from about 30% to about 85% of poly(oxyalkylene) blocks.

6. The soft contact lens of claim 1, wherein the mixture comprises (a) at least one linear poly(oxyalkylene) with two first reactive groups, (b) at least one linear polysiloxane with two second reactive groups, (c) a branched poly(oxyalkylene) with multiple first reactive groups, a branched polysiloxane with multiple second reactive groups, or combination thereof, and (d) optionally the hetero difunctional compound having one ene-containing group and one first or second reactive group.

7. The soft contact lens of claim 6, wherein the mixture further comprises at least one poly(oxyalkylene) with one single first reactive group, wherein the prepolymer comprises about 2% to about 15% of dangling hydrophilic poly(oxyakylene) chains derived from the at least one poly(oxyalkylene) with one single first reactive group.

8. The soft contact lens of claim 6, wherein the mixture further comprises at least one polysiloxane with one single second reactive group.

9. The soft contact lens of claim 1, wherein the prepolymer comprises polysiloxane blocks of formula (V)

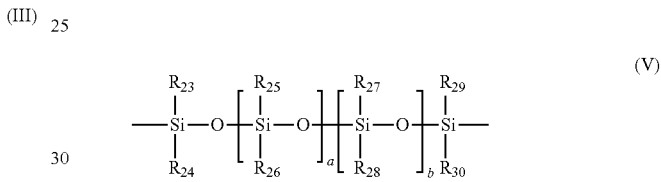

in which $R_{23}$, $R_{24}$, $R_{25}$, $R_{26}$, $R_{27}$, $R_{28}$, $R_{29}$ and $R_{30}$, independently of one another, are $C_1$-$C_8$-alkyl, $C_1$-$C_4$ alkyl- or $C_1$-$C_4$-alkoxy-substituted phenyl, fluorinated $C_1$-$C_{18}$-fluoroalkyl, $C_1$-$C_{18}$ fluoroether, $C_1$-$C_6$-hydroxyalkyl, $C_1$-$C_6$-aminoalkyl, alk-NH-alk-NH$_2$, -alk-(OCH$_2$CH$_2$)$_{n1}$—(OCH$_2$)$_{n2}$—OR$_{31}$, wherein alk is $C_1$-$C_8$-alkylene, $R_{31}$ is hydrogen or $C_1$-$C_6$ alkyl, n1 and n2 independently of one another are an integer from 0 to 10, a and b independently of one other are an integer of from 2 to 700 and (a+b) is from 5 to 700, provided that at least one of $R_{23}$, $R_{24}$, $R_{25}$, $R_{26}$, $R_{27}$, $R_{28}$, $R_{29}$ and $R_{30}$ is fluorinated $C_1$-$C_{18}$-fluoroalkyl, $C_1$-$C_{18}$ fluoroether, $C_1$-$C_6$-hydroxyalkyl, $C_1$-$C_6$-aminoalkyl, alk-NH-alk-NH$_2$, -alk-(OCH$_2$CH$_2$)$_{n1}$—(OCH$_2$)$_{n2}$—OR$_{31}$.

10. The soft contact lens of claim 9, wherein the mixture comprises at least one poly(oxyalkylene) with one single first reactive group, wherein the prepolymer comprises about 2% to about 15% of dangling hydrophilic poly(oxyakylene) chains derived from the at least one poly(oxyalkylene) with one single first reactive group.

11. The soft contact lens of claim 1, wherein the mixture comprising (a) at least one linear poly(oxyalkylene) with two first reactive groups, (b) at least one linear polysiloxane with two second reactive groups, (c) a branched agent having at least three first reactive groups or at least three second reactive groups, and (d) optionally the hetero difunctional compound having one ene-containing group and one first or second reactive group.

* * * * *